United States Patent [19]
Sugeno et al.

[11] Patent Number: 6,083,646
[45] Date of Patent: *Jul. 4, 2000

[54] NON-AQUEOUS ELECTROLYTE SECONDARY BATTERY AND METHOD FOR PRODUCING CATHODE MATERIAL

[75] Inventors: Naoyuki Sugeno; Katsumi Mori, both of Fukushima, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,068

[22] Filed: Aug. 25, 1997

[30] Foreign Application Priority Data

Aug. 29, 1996 [JP] Japan ................................. 8-228967

[51] Int. Cl.$^7$ ....................................................... H01M 4/29
[52] U.S. Cl. ....................................... 429/231.95; 429/224
[58] Field of Search .................................. 429/224, 231.95

[56] References Cited

U.S. PATENT DOCUMENTS 5,629,112  5/1997  Davidson et al. ....................... 429/224
5,807,646  9/1998  Iwata et al. ............................. 429/224

*Primary Examiner*—Maria Nuzzolitto
*Assistant Examiner*—M. Wills
*Attorney, Agent, or Firm*—Hill & Simpson

[57] ABSTRACT

The object of the present invention is to provide a non-aqueous electrolyte secondary battery which uses a lithium-manganese oxide as an cathode material but, suppressing deterioration of an cathode material and a crystalline structure caused by charge/discharge cycles, exhibits an excellent discharge load property and an excellent cycle property. The present invention also provides a method for producing an cathode material which realizes the non-aqueous electrolyte secondary battery.

8 Claims, 23 Drawing Sheets

NON-AQUEOUS ELECTROLYTE SECONDARY BATTERY AND METHOD FOR PRODUCING CATHODE MATERIAL

BACKGROUND OF THE INVENTION

1. Field of the Invention

The present invention relates to a non-aqueous electrolyte secondary battery or cell for use as power source of portable electronic devices, and a method for producing cathode material of the non-aqueous electrolyte secondary battery.

2. Prior Art

In association with a recent remarkable progress of electronic techniques, various portable electronic devices require development of a high-power and small-size secondary battery or cell. There are widely known conventional secondary battery such as nickel-cadmium secondary battery, lead accumulator nickel-hydrogen cells, lithium ion secondary battery, and others. In particular, the lithium ion secondary battery exhibits a high voltage, a high energy density, least self discharge, and an excellent cycle property, and is the most hopeful battery for reducing the size and weight of the battery.

For such lithium ion secondary cells, research has been made for cathode material such as $LiCoO_2$, $LiNiO_2$, and a lithium-manganese oxide of a lower cost such as $LiMn_2O_4$.

However, the lithium-manganese oxide in a fine powder state which has been conventionally used as cathode material cannot be filled sufficiently dense by mechanical compression alone. Especially when the cathode material is formed into a sheet-type electrode, because of the powder characteristics, it is difficult to obtain a large-capacity cell having a flexibility. That is, such powder cannot serve as a material for practical electrodes. Moreover, there is a problem that the lithium ion secondary battery using this fine powder of lithium-manganese oxide as an cathode material exhibits a cycle property which is significantly lowered after several tens of times of charge/discharge. The charge/discharge property is also significantly lowered by lithium in/out movement. Thus, it is difficult to obtain a battery of a high capacity and high power by using a lithium-manganese oxide in a fine powder state.

Furthermore, when using a lithium-manganese oxide having a large particle size which is made from an electrolytic manganese dioxide or the like, because of its small specific surface, it is necessary to mix it with 10% or more of an electroconductive reagent such as fine graphite and acetylene black so as to increase the number of contact points for increasing electron conductivity. However, even if 10% or more of an electroconductive reagent is mixed, the material changes its properties as the cycle proceeds and the discharge capacity is gradually lowered. Moreover, when an electroconductive reagent and metal are added in a great amount for maintaining the charge/discharge property of the active material, this will increase the battery size and cannot realize the simultaneous demand for a higher power and a larger capacity (small size).

Thus, the conventional lithium-manganese oxide which has been used as an cathode material has various problems. When the particle size is small, the cathode filling density cannot be homogeneous or may be lowered and the electrode lacks in flexibility, which affects the cycle property and the capacity. On the contrary, when the particle size is great, a great amount of electroconductive material is required, disabling to increase the specific capacity. Consequently, in spite of the theoretical capacity of 148 mAh/g in $LiMn_2O_4$, the conventional lithium-manganese oxide practically exhibits a charge/discharge capacity of only 110 mAh/g and a cycle service life of 100 cycles. Thus, in practice, only 80% of the theoretical value can be obtained at the most.

In order to solve these problems, research has been made as for the composition of the lithium-manganese oxide and the method for preparing the oxide. However, the lithium-manganese oxide decreases its reversibility as charge/discharge proceeds, significantly lowering its capacity. Thus, the lithium-manganese oxide practically cannot be used as the cathode material. Furthermore, the lithium-manganese oxide is inferior to a lithium-cobalt oxide or lithium-nickel oxide in charge/discharge property at a great current.

In order to solve the above-mentioned problems, the inventors of the present invention examined a crystalline structure which carries out smooth insert and separation of lithium ions. As a result, we have reached the present invention.

OBJECT AND SUMMARY OF THE INVENTION

The object of the present invention is to provide a non-aqueous electrolyte secondary battery which uses a lithium-manganese oxide as an cathode material but, suppressing deterioration of an cathode material and a crystalline structure caused by charge/discharge cycles, exhibits an excellent discharge load property and an excellent cycle property. The present invention also provides a method for producing an cathode material which realizes the non-aqueous electrolyte secondary battery.

The non-aqueous electrolyte secondary battery according to the present invention includes an cathode using a lithium-manganese oxide as active material; an anode capable of doping and de-doping lithium; and a non-aqueous electrolytic solution, and is characterized in that x-ray diffraction of the above-mentioned lithium-manganese oxide shows such diffraction peaks that an intensity ratio between the (311) plane and (400) plane, (400)/(311), is 1.05 to 1.20.

Moreover, in the above mentioned lithium-manganese oxide, it is preferable that an atomic ratio of lithium in respect to manganese, Li/Mn, be 0.505 to 0.525 whereas an atomic ratio of oxygen with respect to manganese, i.e., O/Mn be 1.96 to 2.04.

Furthermore, it is preferable that the aforementioned lithium-manganese oxide be selected from a group consisting of $LiMn_2O_4$ and $Li_2MnO_2$, and a thermogravimetric temperature change in thermogravimetric analysis occurs at 800° C. or below.

A cathode material made of a lithium-manganese oxide can regulate the (400)/(311) intensity ratio so that lithium ions can move smoothly and a lattice distortion caused by lithium separation is propagated into a depth, i.e., homogeneous feature can be obtained, thus suppressing change and deterioration of the cathode material.

Therefore, in the non-aqueous electrolyte secondary battery according to the present invention, by using as an cathode material a lithium-manganese oxide having an intensity ratio of the (311) plane and the (400) plane, i.e., (400)/(311), is 1.05 to 1.20, it is possible to suppress property change of the cathode material and deterioration of the crystalline structure, and stabilize the cycle service life as well as charge/discharge property at a great current.

The method for producing the cathode material according to the present invention is characterized in:

a first processing step wherein a mixture of a manganese source and a lithium source at an atomic ratio of Li/Mn=0.505 to 0.525 is subjected to a heating processing at 450° C. or below; and a second processing step wherein the mixed body obtained at the first processing step is cooled down to a room temperature, crushed, mixed, and subjected to a thermal treatment at 650 to 780° C.

As described above, according to the present invention for producing cathode material, which includes the first processing step and the second processing step, it is possible to obtain a lithium-manganese oxide having homogeneous characteristics. That is, it is possible to obtain a lithium-manganese oxide having crystalline planes with an intensity ratio between the (311) plane and the (400) plane, i.e., (400)/(311) is 1.05 to 1.20. Such a lithium-manganese oxide having homogeneous characteristics and regular crystalline planes exhibit a significant stability. That is, the crystalline structure is not deteriorated by lithium insert/separation, and has a stable cycle service life. The charge/discharge property at a great current is significantly improved.

DETAILED DESCRIPTION OF THE INVENTION

Description will now be directed to a non-aqueous electrolyte secondary battery according to the present invention and a method for production thereof.

The non-aqueous electrolyte secondary battery according to the present invention includes an cathode using lithium-manganese oxide as an active material; an anode capable of doping and de-doping lithium; and a non-aqueous electrolytic solution.

The lithium-manganese oxide used as the cathode material is characterized in that, when subjected to an X-ray diffraction analysis, shows that a diffraction peak intensity ratio between the (311) plane and the (400) plane, i.e., (400)/(311), is 1.05 to 1.20. More preferably, the ratio (400)/(311) is 1.10 to 1.15. When the intensity ratio with respect to the main diffraction plane (111) is taken into consideration, it is more preferable that (311)/(111)=0.45 to 0.50, whereas (400)/(111)=0.49 to 0.59.

The reason of the above mentioned will be explained below.

Figure 1:
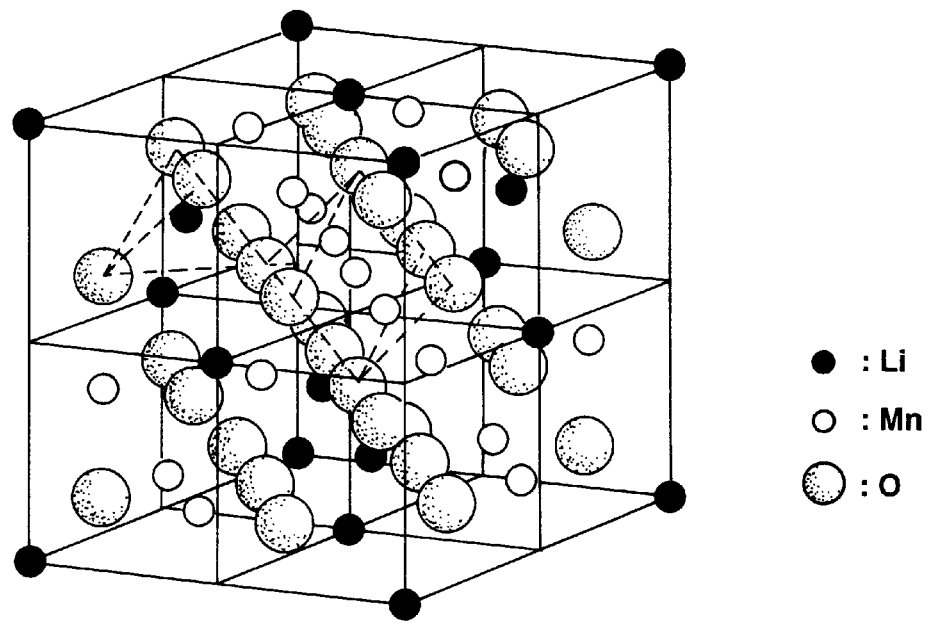
FIG. 1 is a schematic view of a spinel structure.
Figure 2:
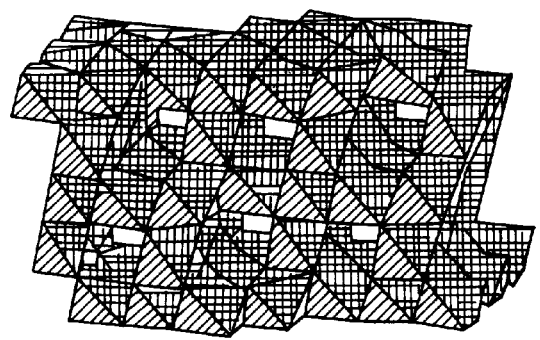
FIG. 2 is a schematic view to be used for explanation of a tunnel network structure of the spinel structure of $LiMn_2O_4$.

As shown in FIG. 1 and FIG. 2, the spinel-type crystalline structure of $LiMn_2O_4$ is an octahedron of MnO in which lithium atoms are positioned, wherein lithium atoms are inserted/separated while moving tunnel spaces located in a slanting direction of the MnO octahedron.

In this lithium movement, a resistance layer is easily generated in a direction vertical to the direction of the lithium movement. It is considered that the lithium movement resisting to this resistance layer causes deterioration of the crystalline structure and, consequently, causes deterioration of the capacity. Especially when a lithium atom is separated from the crystalline surface, the lattice interval of the main crystalline structure is slightly shortened. This distortion is transferred not in the direction of the tunnel through which lithium moves, but is transferred against the lattice plane direction. That is, the lattice interval shortening on the surface reduces a space between octahedrons, and, through charge balance, adjusts the change in the lattice interval. Consequently, the lattice interval shortening is considered not to reach the depth of the crystalline structure. Therefore, an uneven distortion is generated in the crystalline structure of the lithium-manganese oxide as the charge/discharge cycle proceeds, thus deteriorating the crystalline structure.

In order to suppress such deterioration of the crystalline structure, lithium atoms should be regularly located so that change of the lattice interval due to lithium insertion/separation can easily be absorbed, and that distortion of the lattice is transmitted into the depth of the crystalline structure.

Consequently, the present invention employs an X-ray diffraction analysis so as to define the diffraction peak intensity ratio between the (311) plane and the (400) plane, i.e., (400)/(311).

As has been described, in order to suppress deterioration of the crystalline structure caused by lithium insert/separation, the material should have homogeneous material characteristics. That is, it is necessary that the lattice planes should have regularity. The regularity of the lattice plane for smooth insert/separation of lithium atoms does not mean the regularity of the main lattice plane (111) but the regularity of the (311) and (400) planes which are in the vicinity of the direction of lithium dispersion movement. This is the reason why the present invention defines the peak intensity ratio to be (400)/(311) between the (311) plane and the (400) plane.

Thus, the non-aqueous electrolyte secondary battery according to the present invention uses a lithium-manganese oxide having a particular peak intensity ratio (400)/(311) as the cathode material. This suppresses characteristic change of the cathode material itself and deterioration of the crystalline structure, thus enabling to improve the cycle property.

As such a lithium-manganese oxide LixMnOy, it is preferable to use $LiMn_2O_4$ or a mixture of $LiMn_2O_4$ and $LiMn_2O_3$ having a spinel structure, wherein the lithium atom ratio with respect to manganese "x" in the lithium-manganese oxide is 0.505 to 0.525 and the oxygen atom ratio with respect to manganese O/Mn is 1.96 to 2.04.

The above-mentioned lithium-manganese oxide is preferably selected from a group of $LiMn_2O_4$ and $Li_2MnO_3$ in which thermogravimetric analysis shows a thermogravimetric temperature change at 800° C. or below.

A cathode material which satisfies such conditions can be obtained by carrying out thermal treatment under a condition as follows.

The method for producing the cathode material according to the present invention is characterized in:

a first processing step wherein a mixture of a manganese source and a lithium source at an atomic ratio Li/Mn= 0.505 to 0.525 is subjected to a heating processing at 450° C. or below; and a second processing step wherein the mixed body obtained at the first processing step is cooled down to a room temperature, crushed, mixed, and subjected to a thermal treatment at 650 to 780° C.

More particularly, in the first processing step, the mixture of the manganese source and the lithium source is crushed and mixed. Then, the mixture in a powder state, which may have been subjected to compression molding, is further subjected to a thermal treatment in an air atmosphere under a temperature of 450° C. or below. Subsequently, in the second processing step, the thermally-treated material, i.e., a sintered body is cooled down to a room temperature and again crushed and mixed. The mixture in a powder state, which may have been subjected to compression molding, is further subjected to a thermal treatment in an air atmosphere under a temperature of 650 to 780° C.

Thus, according to the present invention, by using the first and the second processing steps, it is possible to obtain a lithium-manganese oxide having homogeneous material characteristics and lattice planes with regularity. That is, this production method enables to obtain a lithium-manganese oxide wherein the intensity ratio between the (311) plane and the (400) plane, i.e., (400)/(311), is 1.05 to 1.20.

By using the above-described method, it is possible to obtain a lithium-manganese oxide having a spinel structure, wherein the lithium atomic ratio "x" with respect to the manganese in the lithium-manganese oxide is 0.505 to 0.525, whereas the oxygen atom ratio with respect to manganese, O/Mn, is 1.96 to 2.04. Moreover, it is possible to obtain a lithium-manganese oxide which shows a thermogravimetric temperature change at 800° C. or below in thermogravimetric analysis.

A lithium-manganese oxide having homogeneous material characteristics and lattice planes with a particular regularity has a stable cycle service life without deterioration of the crystalline structure or change in material characteristics, thus improving the charge/discharge property at a great current.

The manganese source for such lithium-manganese oxide may be manganese dioxide chemically synthesized as well as electrolytically obtained manganese dioxide, dimanganese trioxide, trimanganese tetroxide, manganese oxyhydroxide, manganese sulfate, manganese carbonate, manganese nitrate, or the like. The lithium source for the above-described lithium-manganese oxide may be lithium nitrate, lithium carbonate, lithium hydroxide, lithium acetate, lithium oxalate, or the like. The lithium-manganese oxide can be obtained by mixing these manganese sources and lithium sources and subjecting the mixture to a thermal treatment under the above-described condition.

When using electolytically obtained manganese dioxide as a raw material, there are merits such as a cost and improvement of a filling property. When using chemically synthesized manganese dioxide or other manganese compounds, the tap density is 1.8 g/cm$^3$ whereas the electrolytically obtained manganese dioxide can be filled with a tap density of 2.1 g/cm$^3$ or above. This serves to significantly increase the capacity.

When producing a thin electrode by using an ordinary manganese oxide, it is helpful to exclude particles having a particle size 150 μm or above.

Although the present invention does not depend on the type and particle size of a lithium-manganese oxide, it is preferable to use one synthesized from manganese compounds having a specific surface of 0.5 to 5 m$^2$.

As for an anode material, any material can be used if capable of doping and de-doping lithium such as electrolytically obtained carbons, various types of coke (pitch coke, needle coke, petroleum coke, etc.), various types of graphite, glassy carbon, organic high-molecular compound sintered (such as phenol resin and furan resin which have been calcinated at an appropriate temperature), carbonaceous material such as carbon fiber activated carbon, or metallic lithium, lithium alloy (for example, lithium-aluminium alloy) as well as polymers such as polyacetylene and polypyrole.

As has been mentioned above, each of those materials used for a secondary battery can be used for a negative electrode. However, those carbon materials which will be described below are particularly preferable.

First of all, one of the most preferable materials is a carbon material which will not be graphitized even if treated by heat in the order of 3000° C., i.e., a hard-to-graphitize carbon.

As a starting raw material for preparing such a hard-to-graphitize carbonaceous material, it is preferable to use a furan resin made of a homopolymer or a copolymer of furfuryl alcohol or furfural, because such a furan resin which has been carbonized becomes a material exhibiting excellent properties as a negative electrode material of a battery: a spacing of the (002) plane is 0.37 nm or above; a true density is 1.70 g/cc or below; and a differential thermal analysis (DTA) shows an oxidation exothermic peak at 700° C. or above.

It is also possible to use as another starting material, an organic material made of a petroleum pitch having a particular H/C atomic ratio and containing a functional group containing oxygen (so called oxygen bridge or crosslink), which organic material, when carbonized, becomes a carbonaceous material with excellent properties in the same way as the above-mentioned furan resin.

The above-mentioned petroleum pitch can be obtained through operations such as distillation (vacuum distillation, atmospheric distillation, steam distillation), thermal polymerization/condensation, extraction, chemical polymerization/condensation or the like of tars and asphalt obtained through high-temperature thermal cracking of coal tar, ethylene bottom oil, crude oil or the like.

In this case, what is important about the petroleum pitch is the H/C atomic ratio. The H/C atomic ratio should be 0.6 to 0.8 in order to obtain a hard-to-graphite carbon.

The method how to introduce the functional group containing oxygen into the petroleum pitch is not restricted to particular means. For example, it is possible to use a wet type method using an aqueous solution of nitric acid, mixed acid, sulfuric acid, hypochlorous acid or the like; a dry type method using an oxidation gas (air, oxygen, or the like); a solid type method using a reaction of a solid reagent sulfuric acid, ammonium nitrate, ammonium persulfate, ferric chloride, or the like.

For example, when a functional group containing oxygen is introduced to the petroleum pitch in the above-described method, it is possible to obtain a final carbonaceous material in a solid state without melting during a process of carbonization (at about 400° C.), which is similar to the process for preparing a hard-to-graphitize carbon.

The petroleum pitch into which a functional group containing oxygen has been introduced is further carbonized so as to obtain a negative electrode material. In this case, carbonization conditions are not restricted to a particular one. If the carbonization condition is defined so as to enable to obtain a carbonaceous material which satisfies the following characteristics: spacing of the (002) plane of 0.37 nm or above, true density of 1.70 g/cc or below, and differential thermal analysis (DTA) not exhibiting an oxidation exothermic peak above 700° C.; then it is possible to obtain a negative electrode material having a large lithium doping amount per unit weight. For example, if the condition is defined so as to realize that a precursor prepared from an oxygen-bridged petroleum pitch has an oxygen content of 10% by weight or above, it is possible to obtain 0.37 nm or above of (002) spacing of a carbonaceous material to be prepared. Consequently, it is preferable that the oxygen content of the aforementioned precursor be 10% by weight or above, and in practice, in a range of 10 to 20% by weight.

The organic material to be oxygen-bridged should have the H/C atomic ratio of 0.6 to 0.8, which can be obtained by preliminary thermal processing (such as pitching) of starting raw materials as follows.

Such starting raw materials may be: organic high molecular compounds such as phenolic resin, acrylic resin, halogenated vinyl resin, polyimide resin, poly-amide-imide resin, polyamide resin, conjugate resin, cellulose, and derivatives thereof; condensated polycyclic hydro carbon compounds such as naphthalene, phenanthlene, anthracene, triphenylene, pyrene, perylene, pentaphene, pentacene, and derivatives thereof (for example, carboxylic acid, carboxylic anhydride, carboxylic imide thereof, or the like); various types of pitches each having as a main component a mixture of the above-mentioned compounds; and condensated heterocyclic compounds such as acenaphthylene, indole, isoindole, quinoline, isoquinoline, quinoxaline, phtalazine, carbazole, acridine, phenazine, phenanthlysine, or the like, and derivatives thereof.

The anode material may be a carbonaceous material which is graphitized when treated at about 3000° C., i.e., a graphitizable carbon.

The starting raw material of the graphitizable carbon may be organic material such as coal and pitch.

The pitch can be obtained from tars and asphalt obtained through high-temperature cracking of coal tar, ethylene bottom oil, crude oil, or the like which are then subjected to operations such as distillation (vacuum distillation, atmospheric distillation, steam distillation), thermal polymerization/condensation, extraction, chemical polymerization/condensation or the like. There is also a pitch which can be obtained during wood dry distillation.

Raw materials of the high molecular compounds may be polyvinyl chloride resin, polyvinyl acetate, polyvinyl butyrate, 3,5-dimethylphenol resin, or the like.

These starting raw materials are in a liquid state at about 400° C. at maximum during carbonization. If these materials are kept at this temperature, aromatic rings are condensated with one another so as to become polycyclic and layered. After this, when the temperature becomes about 500° C. or above, a solid carbon precursor, i.e., semicoke is obtained. This process is called a liquid-phase carbonization process, which is a typical process for the graphitizable carbon.

The above-mentioned raw materials of coal, pitch, and high molecular compounds go through this liquid-phase carbonization process when they are carbonized.

Besides these materials, it is possible to use as the starting raw materials: condensated polycyclic hydro carbonate compounds such as naphthalene, phenanthlene, anthracene, triphenylene, pyrene, perylene, pentaphene, pentacene, and derivatives thereof (for example, carboxylic acid, carboxylic anhydride, carboxylic imide thereof, or the like); mixtures of the aforementioned compounds; and condensated heterocyclic compounds such as acenaphthylene, indole, isoindole, quinoline, isoquinoline, quinoxaline, phtalazine, carbazole, acridine, phenazine, phenanthlysine, or the like, and derivatives thereof.

When the above-mentioned organic raw materials are used to obtain a carbonaceous material, it is recommended to carry out carbonization at 300 to 700° C. in a nitrogen stream and then calcinating in a nitrogen stream under a temperature condition as such that the temperature increases 1 to 20° C. per minute until the temperature reaches 900 to 1300° C. and then the reached temperature is kept for 0 to 5 hours. In some cases, it is possible to omit the process of carbonization.

Furthermore, the negative electrode active material may be a graphitized carbonaceous material having (002) spacing of 0.337 nm or below; crystal thickness along the G axis of 16.0 nm or above; G value of 2.5 or above in the Raman spectrum; and true density of 2.1 $g/cm^3$ or above. This material exhibits an excellent electrode charging property, enabling to obtain a large capacity cell.

The representative material showing the above-mentioned material characteristic parameters is natural graphite. Artificial graphite obtained from an organic material which has been carbonized and thermally treated also shows the aforementioned material characteristic parameters. In order to obtain an artificial graphite, it is possible to use the aforementioned graphitizable carbon material as a precursor, which is treated at a high temperature of 2000° C. or above.

The carbonaceous materials thus far described are crushed and classified into various classes so as to be used as a negative electrode material. The crushing process may be carried out prior to or after the carbonation, calcination, high-temperature thermal treatment, or during the stage of temperature increase.

The electrolytic solution is made from a lithium salt which is dissolved in an organic solvent at a concentration of 0.5 to 1.5 molls/l, thus obtaining a non-aqueous electrolytic solution. The organic solvent is not limited to particular materials. For example, the organic solvent may be cyclic ester such as propylene carbonate, ethylene carbonate, butylene carbonate, and γ-butylolactone; or chain ester such as dimethyle carbonate, ethylmethyl carbonate; acetic ester compound, propionic ester compound, diacetic ester compound, dimethoxyethane, diethoxyethane, dimethoxypropane, diethoxypropane, tetrahydrafuran, dioxolane, or the like, as a single material solvent, or a mixture of more than one materials can also be used as a composite solvent.

Especially, it is preferable that an cyclic ester be mixed with a chain ester for preparing a solvent, because the solvent exhibits an improved low-temperature property.

The electrolytic material may be lithium perchlorate, lithium trifluoromethane sulfonate, lithium tetrafluoroborate, lithium hexafluorophosphate, lithium hexafluoroarsenate, or the like.

The non-aqueous electrolyte secondary battery according to the present invention may be formed into a shape which is not limited to a particular shape and can be applied to various shapes such as a coin-type battery, cylindrical-volute-type battery, plate-type angular battery, and inside-out-type cylindrical battery. The present invention refers to a small-size battery. However, the present invention can also be applied to a large-size battery if a cost is taken into consideration.

EXAMPLES AND COMPARATIVE EXAMPLES

Description will now be directed to examples of a coin-type lithium secondary battery using $LiMn_2O_4$ as the main content of the cathode material. However, the present invention is not to be limited to the following Examples.

Example 1

Manganese carbonate and lithium nitrate were taken into a mortar at an atomic ratio Mn:Li=1:0.52 and mixed into a mixture. The mixture was subjected to compression molding so as to obtain a pellet of 13 mm diameter and 1 mm thickness. The pellet was further crushed roughly in a mortar. Subsequently, the crushed mixture was put into an alumina casing, which was put into an electric furnace so as to be subjected to thermal processing in an oxygen atmosphere at 350° C. for 2 hours. Then, the mixture was cooled down to a room temperature, again mixed in the mortar, and subjected to compression molding into a pellet shape. The molded mixture was put into the alumina casing and subjected to thermal processing in an oxygen atmosphere at 750° C. for 16 hours by using the electric furnace. After this, the mixture was cooled down to a room temperature so as to obtain an cathode material.

Figure 3:
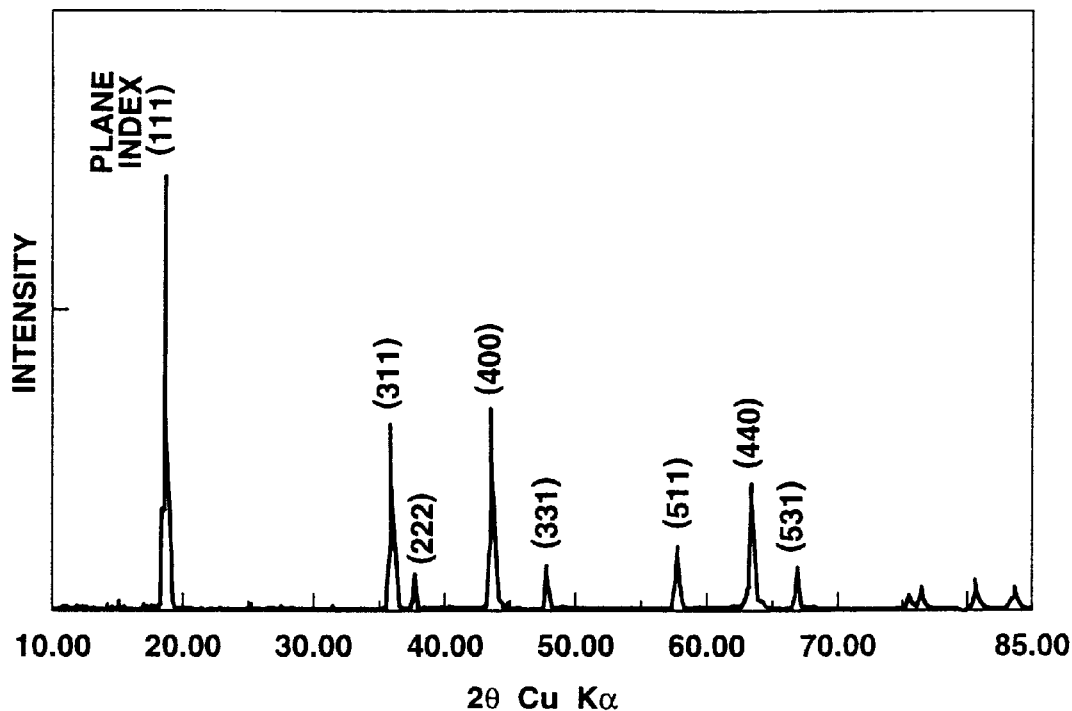
FIG. 3 is a chart showing X-ray diffraction peaks of Example 1.

The cathode material obtained was subjected to an X-ray diffraction analysis. FIG. 3 shows the X-ray diffraction peaks obtained by this mixture, which coincide with the X-ray diffraction peaks of a spinel type $LiMn_2O_4$. The intensity ratio of the diffraction peak corresponding to the (311) plane with respect to the diffraction peak corresponding to the (411) plane, i.e., (400)/(311) was 1.15.

The X-ray diffraction analysis was carried out by using an X-ray diffraction apparatus (with a trade name Guigerflex RAD-C produced by Rigakusha).

Example 2

An cathode material was obtained in the same way as in Example 1 except for that the atomic ratio between manganese carbonate and lithium nitrate was as follows: Mn:Li=1:0.515.

Figure 4:
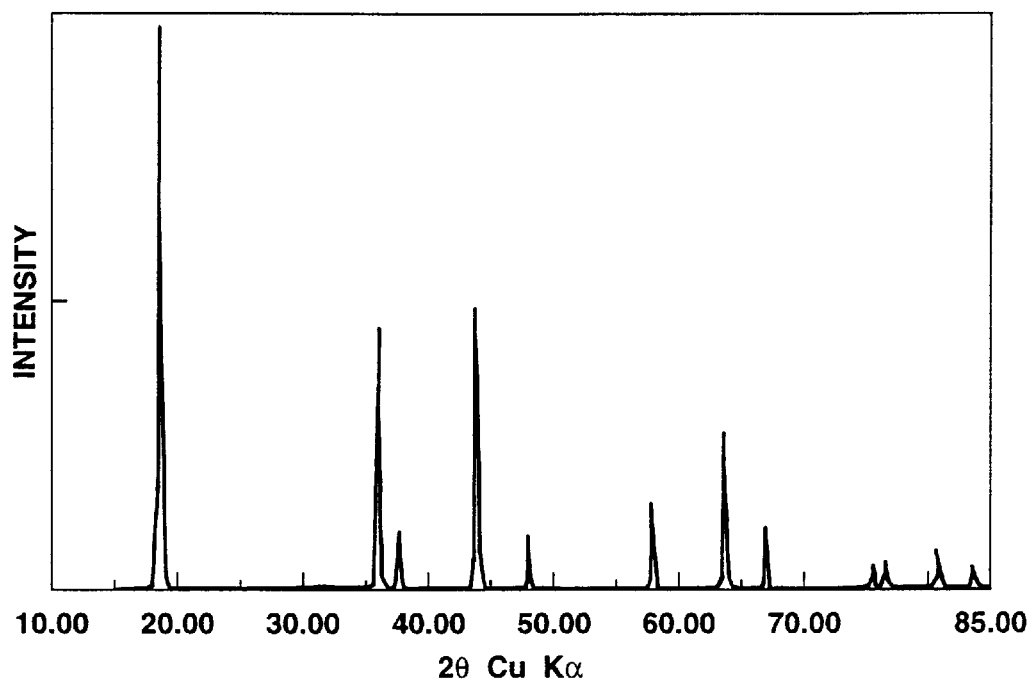
FIG. 4 is a chart showing X-ray diffraction peaks of Example 2.

The cathode material obtained was subjected to X-ray diffraction analysis. FIG. 4 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.13.

Example 3

Manganese oxyhydroide and lithium nitrate were weighed and mixed at an atomic ratio as follows: Mn:Li=1:0.51 so as to obtain an cathode material in the same way as in Example 1.

Figure 5:
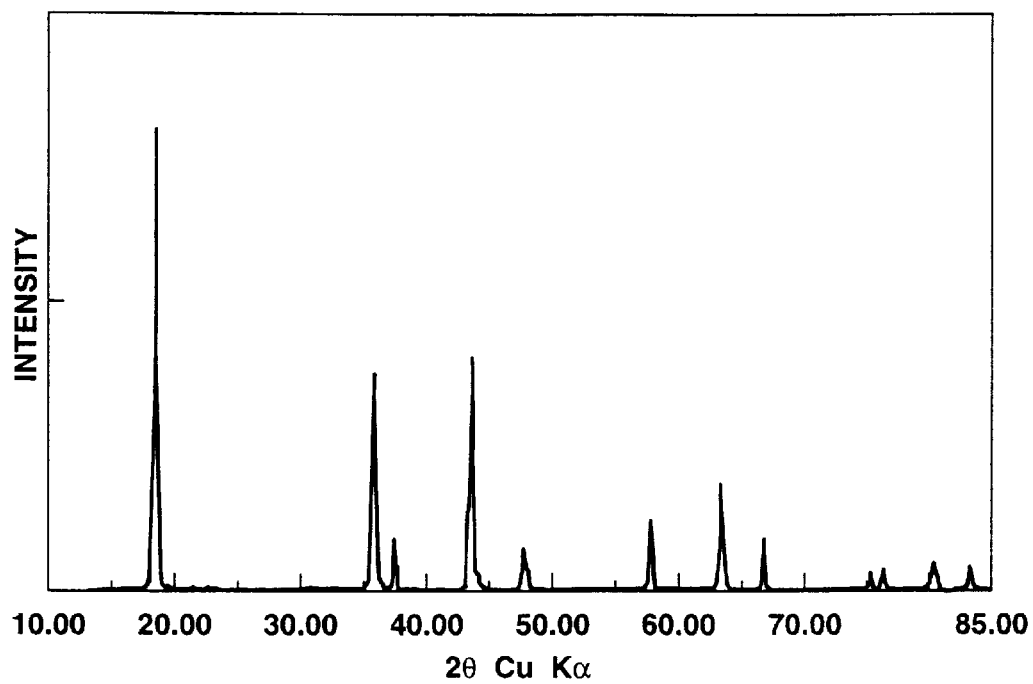
FIG. 5 is a chart showing X-ray diffraction peaks of Example 3.

The cathode material obtained was subjected to X-ray diffraction analysis. FIG. 5 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.10.

Example 4

Manganese oxyhydroide and lithium nitrate were weighed and mixed at an atomic ratio as follows: Mn:Li=1:0.515 so as to obtain an cathode material in the same way as in Example 1 except for that, firstly, a thermal treatment was carried out at 400° C. for 2 hours to obtain a molded body, which was cooled down to a room temperature; and after this, the molded body was mixed in the mortar, subjected compression molding so as to obtain a pellet-type body, which was subjected to a thermal treatment at 780° C. for 16 hours.

Figure 6:
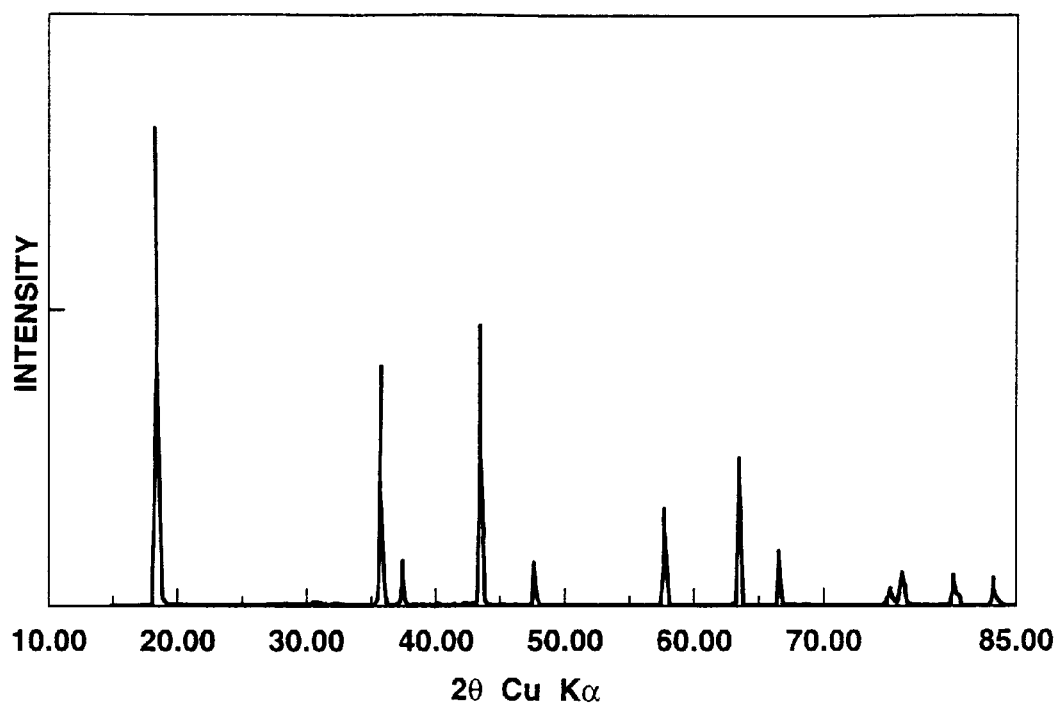
FIG. 6 is a chart showing X-ray diffraction peaks of Example 4.

The cathode material obtained was subjected to X-ray diffraction analysis. FIG. 6 shows diffraction peaks observed, which coincide with the X-ray diffraction peaks of the spinel-type LiMn2O4. The diffraction peak intensity ratio between the diffraction peak corresponding to the (311) plane and the diffraction peak corresponding to the (411) plane, i.e., (400)/(311) was 1.19.

Example 5

Manganese oxyhydroide and lithium nitrate were taken into a mortar at an atomic ratio Mn:Li=1:0.515 and mixed into a mixture. The mixture was subjected to compression molding so as to obtain a pellet of 13 mm diameter and 1 mm thickness. Subsequently, the pellet was put into an alumina casing, which was put into an electric furnace so as to be subjected to thermal processing in an oxygen atmosphere at 400° C. for 3 hours. Then, the mixture was cooled down to a room temperature, again crushed and mixed in the mortar, put into the alumina casing and subjected to thermal processing in an oxygen atmosphere at 700° C. for 12 hours by using the electric furnace. After this, the mixture was cooled down to a room temperature so as to obtain an cathode material.

Figure 7:
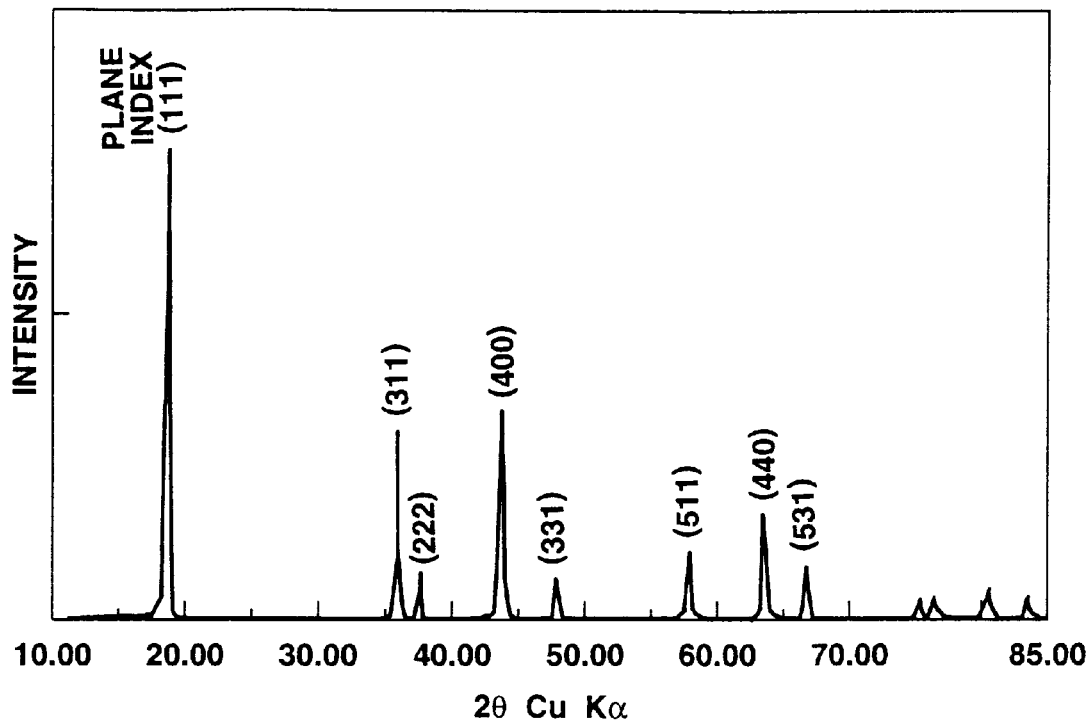
FIG. 7 is a chart showing X-ray diffraction peaks of Example 5.

The cathode material obtained was subjected to an X-ray diffraction analysis. FIG. 7 shows the X-ray diffraction peaks obtained by this mixture, which coincide with the X-ray diffraction peaks of a spinel type $LiMn_2O_4$. The intensity ratio of the diffraction peak corresponding to the (311) plane with respect to the diffraction peak corresponding to the (411) plane, i.e., (400)/(311) was 1.12.

Example 6

Manganese oxyhydroxide and lithium hydroxide were mixed at an atomic ratio as follows: Mn:Li=1:0.51 so as to obtain an cathode material in the same way as in Example 5 except for that, the second heating temperature was set to 750° C.

Figure 8:
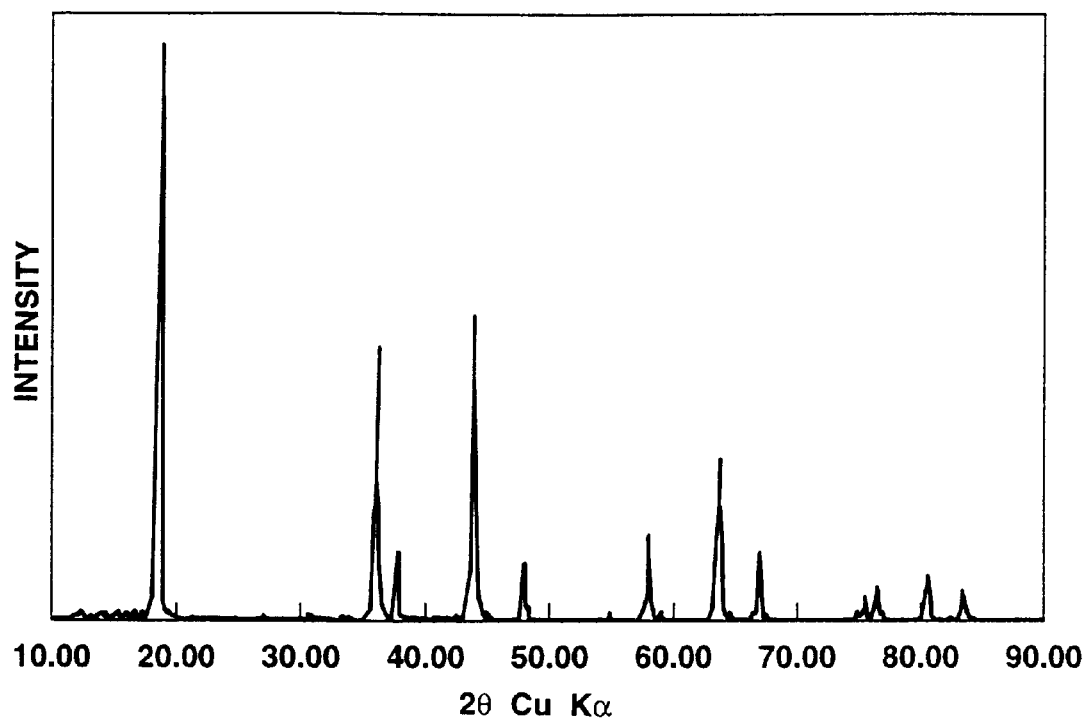
FIG. 8 is a chart showing X-ray diffraction peaks of Example 6.

The cathode material obtained was subjected to X-ray diffraction analysis. FIG. 8 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.13.

Example 7

Manganese oxyhydroxide and lithium hydroxide were mixed at an atomic ratio as follows: Mn:Li=1:0.52 so as to obtain an cathode material in the same way as in Example 5 except for that, the second heating temperature was set to 650° C.

Figure 9:
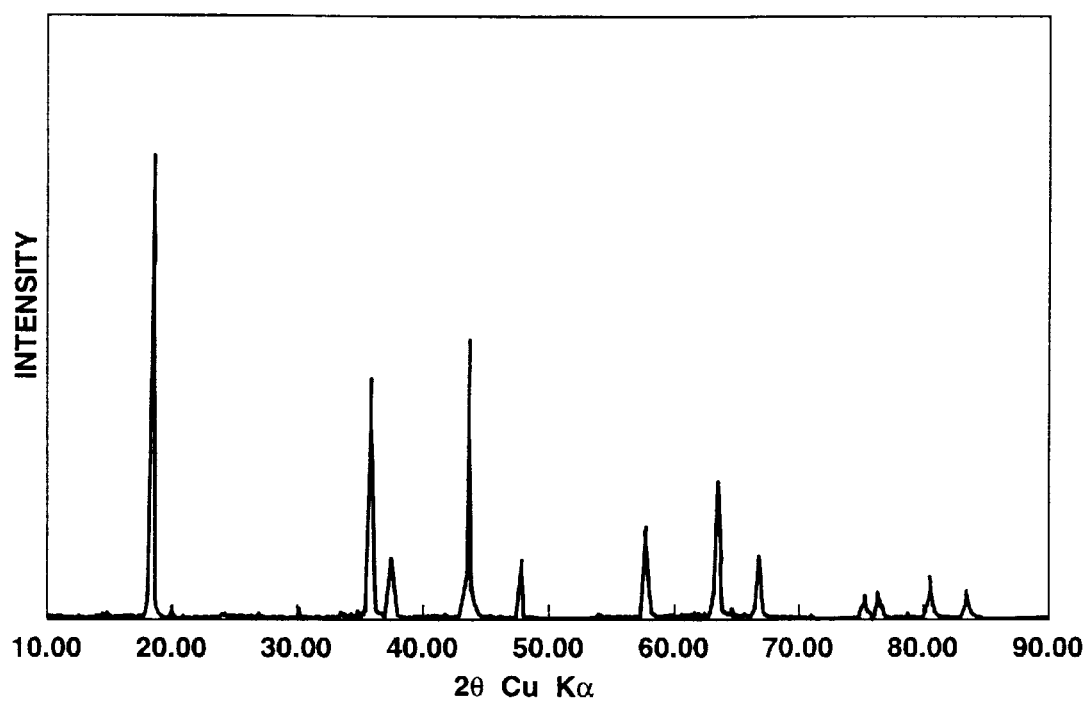
FIG. 9 is a chart showing X-ray diffraction peaks of Example 7.

The cathode material obtained was subjected to X-ray diffraction analysis. FIG. 9 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.15.

Example 8

Manganese oxyhydroxide and lithium hydroxide were mixed at an atomic ratio as follows: Mn:Li=1:0.525 so as to obtain an cathode material in the same way as in Example 5 except for that, the second heating temperature was set to 750° C.

Figure 10:
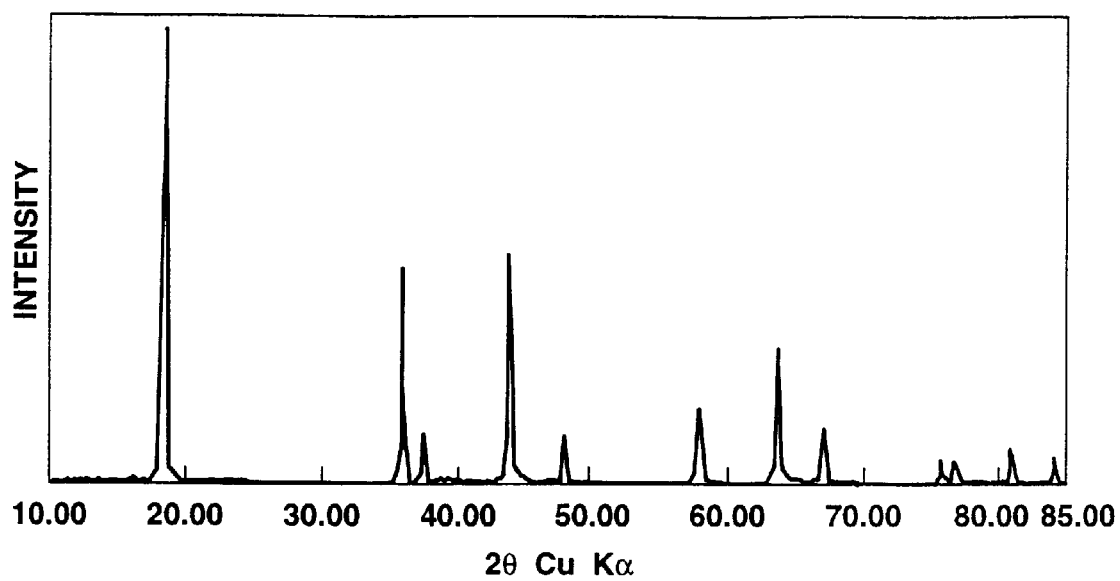
FIG. 10 is a chart showing X-ray diffraction peaks of Example 8.

The cathode material obtained was subjected to X-ray diffraction analysis. FIG. 10 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.17.

Comparative Example 1

Manganese oxyhydroxide and lithium nitrate were mixed at an atomic ratio as follows: Mn:Li=1:0.515 so as to obtain a cathode material in the same way as in Example 1 except for that, the second heating temperature was set to 800° C.

Figure 11:
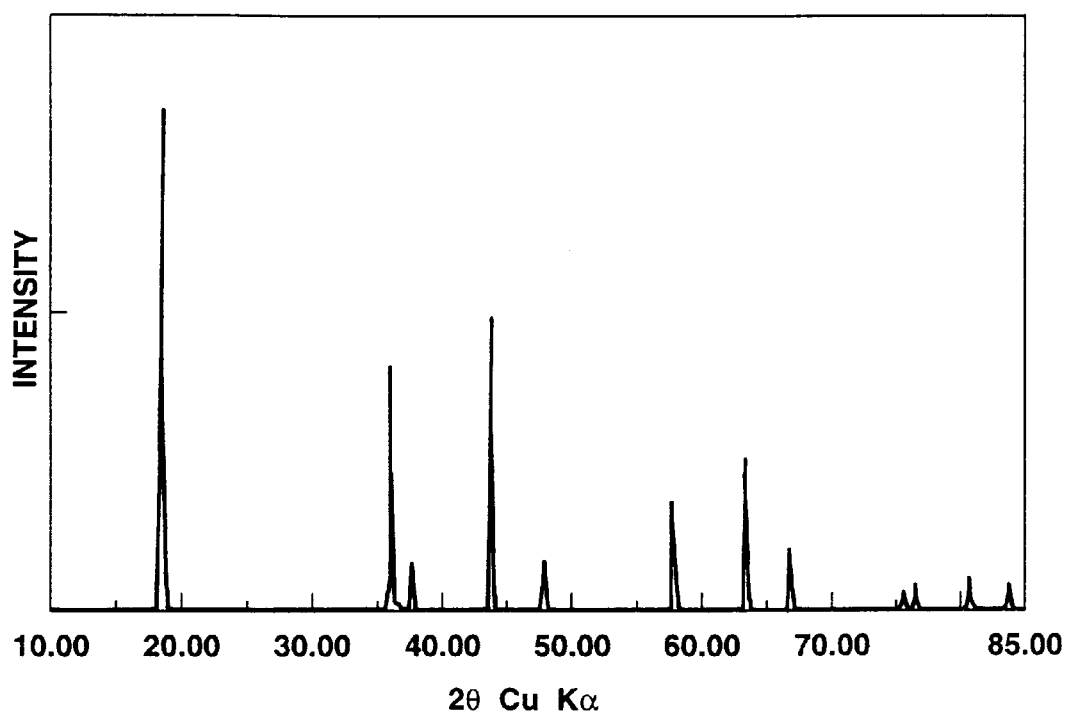
FIG. 11 is a chart showing X-ray diffraction peaks of Comparative Example 1.

The cathode material obtained was subjected to X-ray diffraction analysis. FIG. 11 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.21.

Comparative Example 2

Manganese dioxide electrolytically obtained and lithium nitrate were mixed at an atomic ratio as follows: Mn:Li=1:0.51 so as to obtain an cathode material in the same way as in Example 1 except for that the second heating temperature was set to 800° C.

Figure 12:
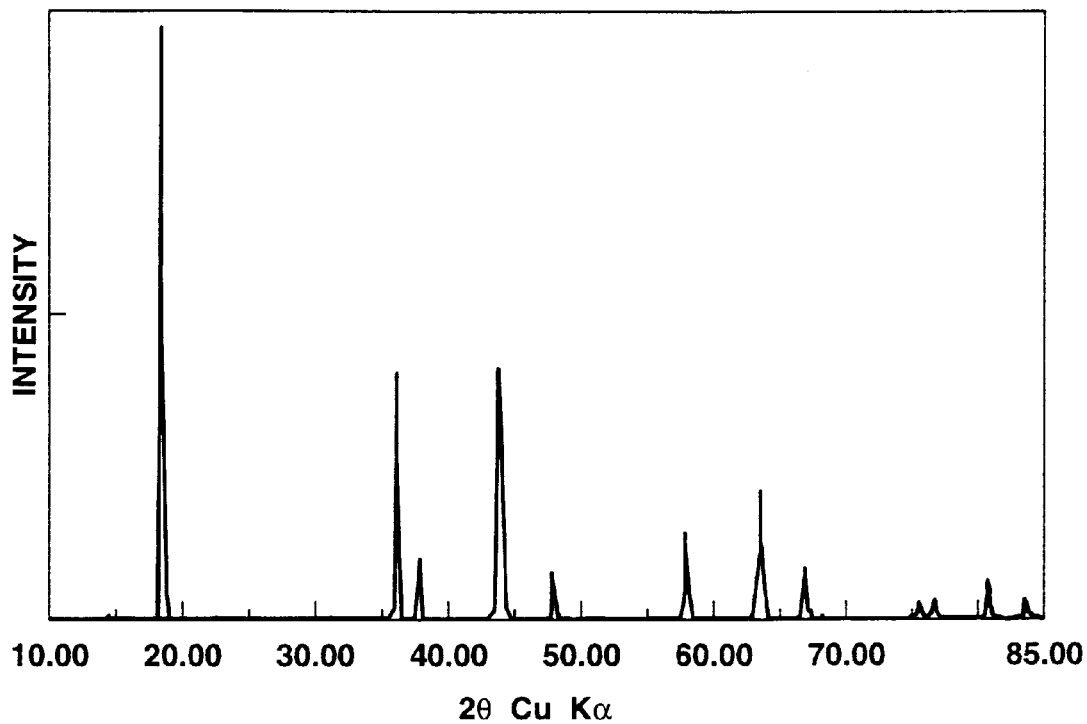
FIG. 12 is a chart showing X-ray diffraction peaks of Comparative Example 2.

The cathode material obtained was subjected to X-ray diffraction analysis. FIG. 12 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.03.

Comparative Example 3

Manganese oxyhydroxide and lithium nitrate were mixed at an atomic ratio as follows: Mn:Li=1:0.51 so as to obtain a cathode material in the same way as in Example 1 except for that the second heating temperature was set to 600° C.

Figure 13:
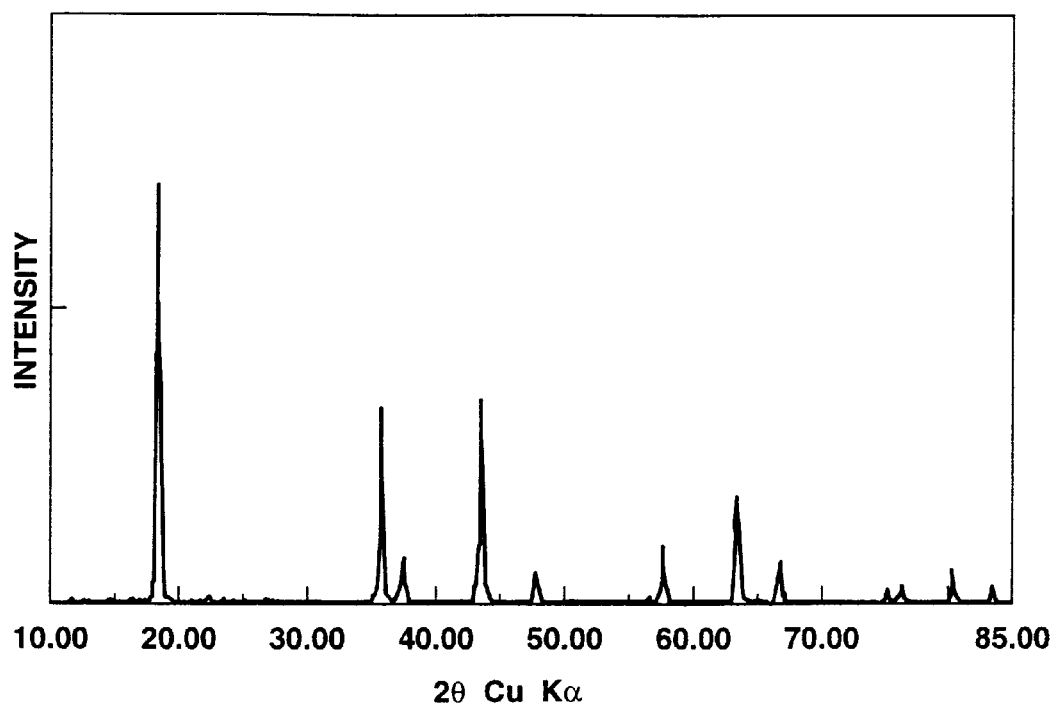
FIG. 13 is a chart showing X-ray diffraction peaks of Comparative Example 3.

The cathode material obtained was subjected to X-ray diffraction analysis. FIG. 13 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 0.97.

Comparative Example 4

Manganese oxyhydroxide and lithium nitrate were mixed at an atomic ratio as follows: Mn:Li=1:0.53. Except for this, an cathode material was obtained in the same way as in Example 1.

Figure 14:
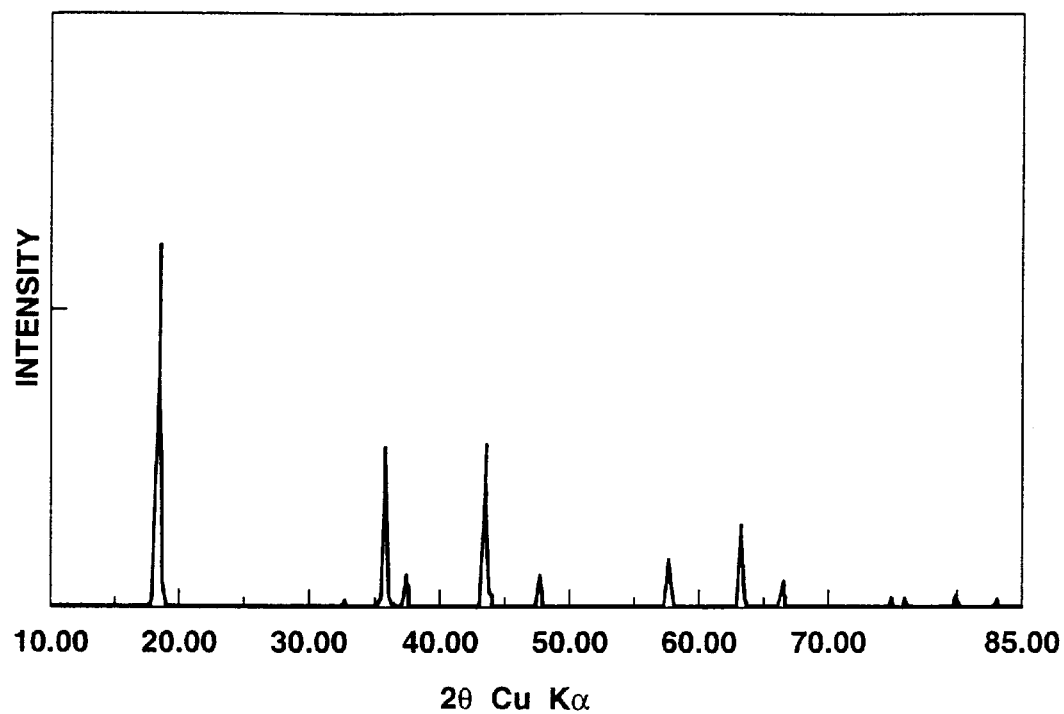
FIG. 14 is a chart showing X-ray diffraction peaks of Comparative Example 4.

The cathode material obtained was subjected to X-ray diffraction analysis. FIG. 14 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.01.

Comparative Example 5

Manganese oxyhydroxide and lithium hydroxide were mixed in a mortar at an atomic ratio as follows: Mn:Li=1:0.515. The mixture thus obtained was put into an alumina casing and subjected to thermal treatment in an air atmosphere at a temperature of 400° C. for 3 hours; and then at 750° C. for 12 hours. The mixture was then cooled down to a room temperature so as to obtain an cathode material.

Figure 15:
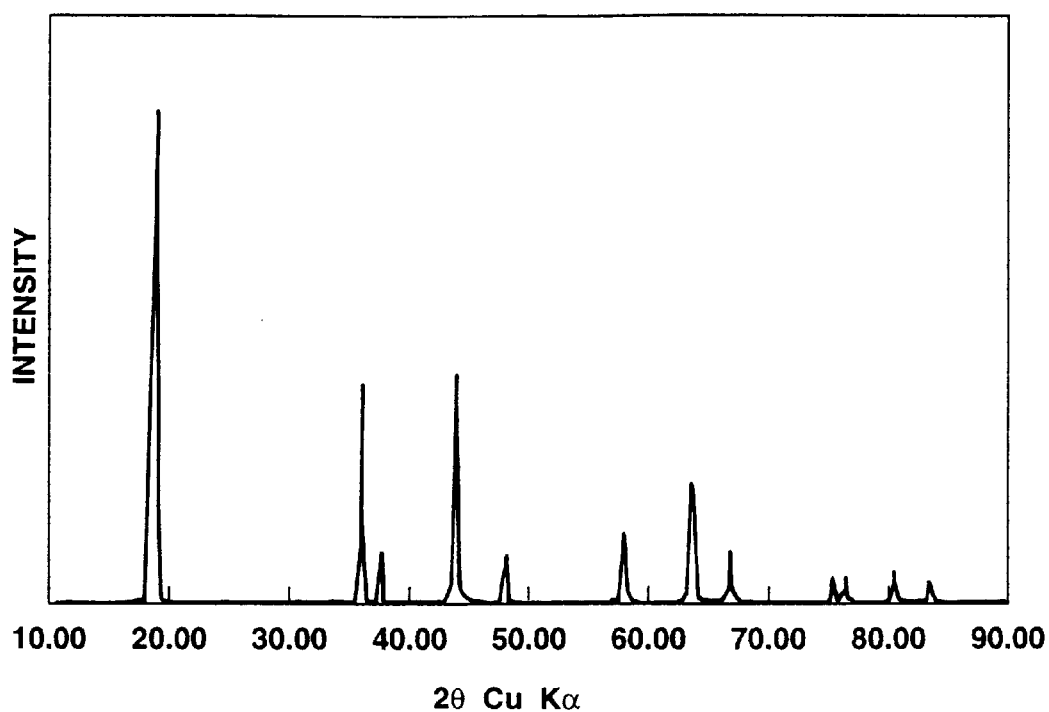
FIG. 15 is a chart showing X-ray diffraction peaks of Comparative Example 5.

The cathode material obtained was subjected to X-ray diffraction analysis. FIG. 15 shows diffraction peaks observed, which coincide with the X-ray diffraction peaks of the spinel-type LiMn2O4. The diffraction peak intensity ratio between the diffraction peak corresponding to the (311) plane and the diffraction peak corresponding to the (411) plane, i.e., (400)/(311) was 1.05.

Comparative Example 6

A cathode material was obtained almost in the same way as in Comparative Example 5. The mixture of manganese oxyhydroxide and lithium hydroxide was subjected to thermal treatment in an air atmosphere at a temperature of 400° C. and the molded body was cooled down to a room temperature and again crushed and mixed. Subsequently, the mixture was subjected to a thermal treatment in an air atmosphere at a temperature of 800° C.

Figure 16:
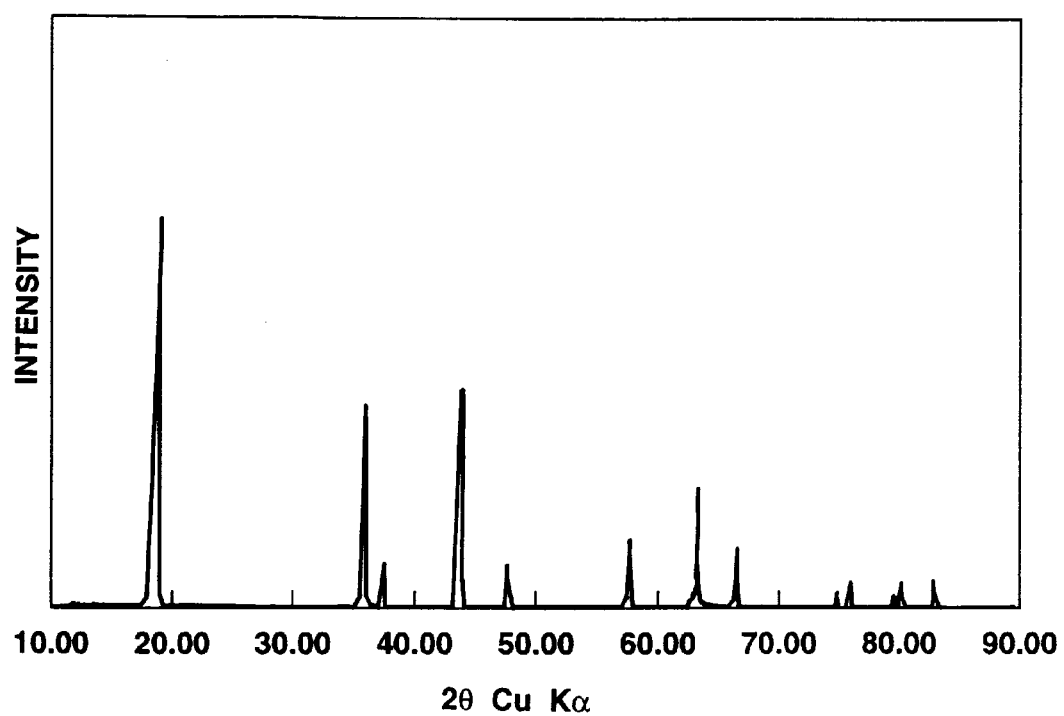
FIG. 16 is a chart showing X-ray diffraction peaks of Comparative Example 6.

The cathode material obtained was subjected to X-ray diffraction analysis. FIG. 16 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.07.

Comparative Example 7

A cathode material was obtained almost in the same way as in Comparative Example 5 except for that the mixture was subjected to thermal treatment in an air atmosphere at a temperature of 480° C., and then to a thermal treatment in an air atmosphere at a temperature of 640° C.

Figure 17:
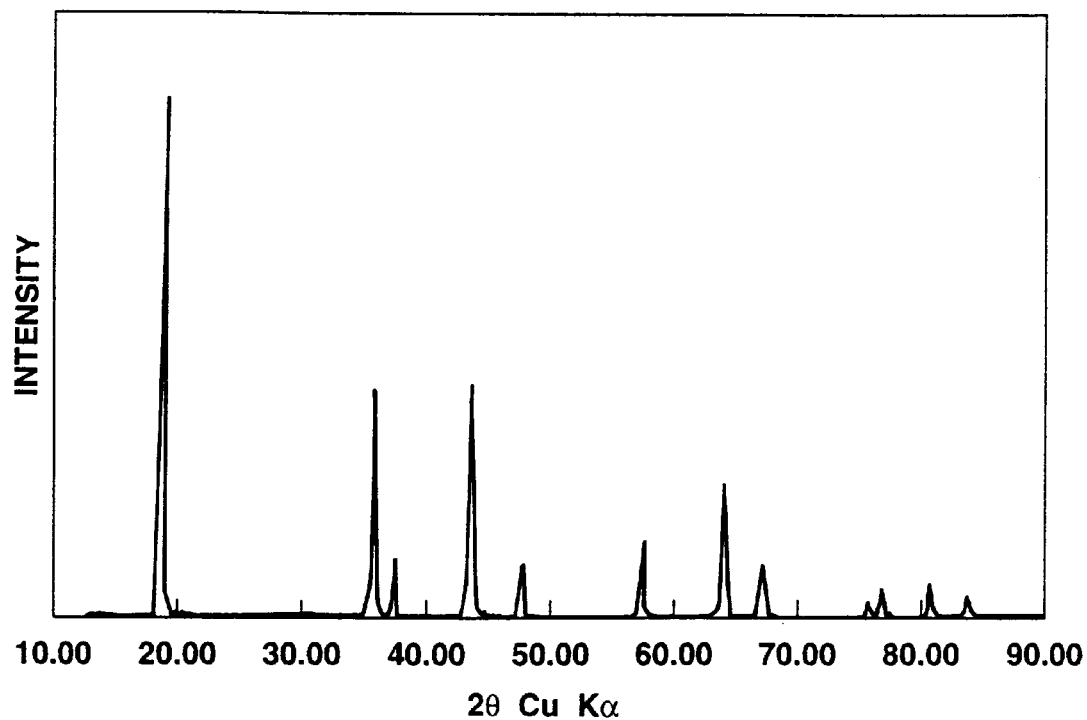
FIG. 17 is a chart showing X-ray diffraction peaks of Comparative Example 7.

The cathode material obtained was subjected to X-ray diffraction analysis. FIG. 17 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.02.

Comparative Example 8

Manganese oxyhydroxyde was mixed with lithium hydroxyde at an atomic ratio of Mn:Li=1:0.525 and the mixture was subjected to compression molding. The molded body was subjected to thermal treatment in an air atmosphere at a temperature of 350° C., and then to a thermal treatment in an air atmosphere at a temperature of 860° C., so as to obtain an cathode material in the same way as in Example 5.

Figure 18:
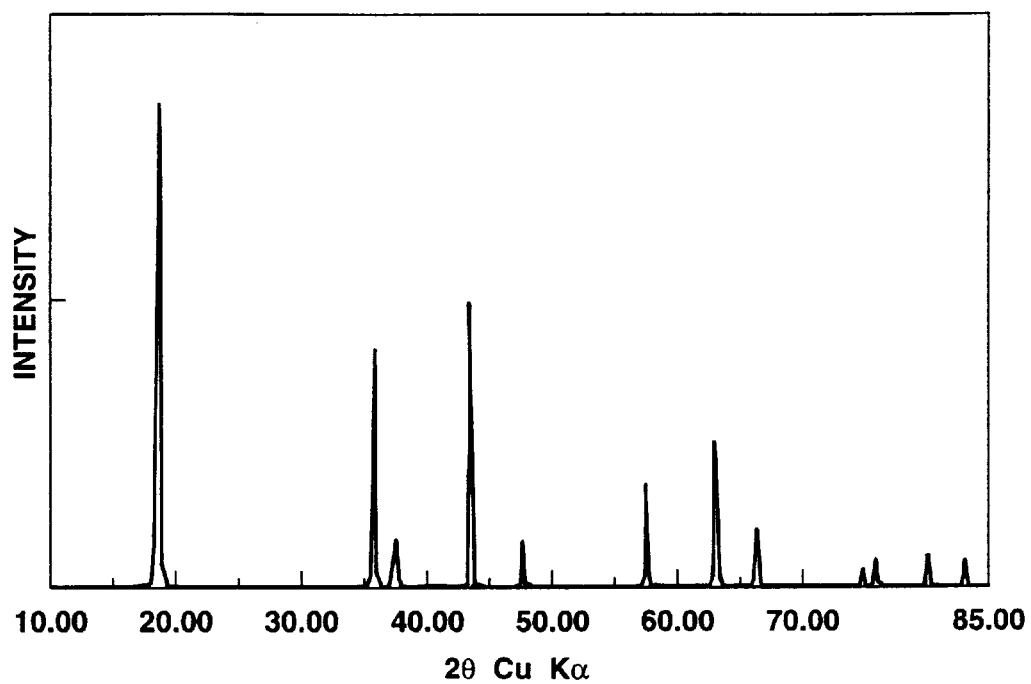
FIG. 18 is a chart showing X-ray diffraction peaks of Comparative Example 8.

The cathode material obtained was subjected to X-ray diffraction analysis. FIG. 18 shows diffraction peaks observed, which coincide with the X-ray diffraction peaks of the spinel-type $LiMn_2O_4$. The diffraction peak intensity ratio between the diffraction peak corresponding to the (311) plane and the diffraction peak corresponding to the (411) plane, i.e., (400)/(311) was 1.22.

Evaluation of the Cathode Material Property

The cathode materials obtained in Examples 1 to 8 were produced by the first processing step wherein a thermal treatment is carried out at 450° C. or below and the second processing step wherein the mixture obtained in the first processing step is again crushed and mixed, and then subjected to a thermal treatment at a temperature ranging from 650 to 780° C. The cathode materials thus obtained exhibit diffraction peak intensity ratio between the (311) plane and the (411) plane, i.e., (400)/(311) regulated to 1.05 to 1.20.

On the contrary, the cathode materials obtained in Comparative Examples 1 to 3 and 6 to 8 exhibit the diffraction peak intensity ratio (400)/(311) between the (311) plane and the (411) plane which does not satisfy the above-described range, because the heating temperature in the second processing step is below 650° C. or above 780° C. As for Comparative Example 4, the lithium-manganese oxide has an atomic ratio "x" between manganese and lithium exceeding 0.525, and it is impossible to obtain the regularity of the lattice planes which is an object of the present invention. Moreover, in Comparative Example 5, no mixing is carried out between the first processing step and the second processing step, and it is impossible to obtain the regularity of the lattice planes which is an object of the present invention.

The cathode materials obtained Examples 1 to 4 and Comparative Examples 1 to 4 were analysed to determine their compositions by using the iron-isolating permanganic acid direct titration (Japan Industry Standard (JIS) M8232) for manganese; and the atomic absorption method for the metals other than manganese. The results are shown in Table 1 below.

TABLE 1

| $Li_xMn_2O_y$ | Li | x | Mn | y |
|---|---|---|---|---|
| Example 1 | 3.97% | 1.03 | 59.7% | 3.97 |
| Example 2 | 3.95% | 1.025 | 59.8% | 3.98 |
| Example 3 | 3.92% | 1.02 | 59.8% | 3.98 |
| Example 4 | 3.91% | 1.02 | 59.8% | 3.98 |

TABLE 1-continued

| $Li_xMn_2O_y$ | Li | x | Mn | y |
|---|---|---|---|---|
| Comparative Example 1 | 3.96% | 1.03 | 59.7% | 3.97 |
| Comparative Example 2 | 3.93% | 1.02 | 59.8% | 3.98 |
| Comparative Example 3 | 3.93% | 1.02 | 59.8% | 3.97 |
| Comparative Example 4 | 4.02% | 1.05 | 59.2% | 3.91 |

As shown in Table 1, it was confirmed that the cathode material has a composition ratio which almost corresponds to the mixing ratio of the raw materials. It is also known that similar results can be obtained for the other Examples.

Furthermore, in order to determine the material properties of the cathode materials obtained in the above-described method, particle sizes (diameters) and specific surfaces were measured for the cathode materials obtained in Examples 1 to 4 and Comparative Examples 1 to 4. Moreover, the particle size (diameter) distribution was determined by using a laser-type apparatus. The results are shown in FIG. 2 below.

TABLE 2

| Cathode material | 50% cumulative probability distribution (mm) | Specific surface (mm) |
|---|---|---|
| Example 1 | 25 | 3.2 |
| Example 2 | 22 | 3.5 |
| Example 3 | 22 | 2.7 |
| Example 4 | 22 | 2.9 |
| Comparative Example 1 | 17 | 3.8 |
| Comparative Example 2 | 32 | 1.5 |
| Comparative Example 3 | 27 | 3.7 |
| Comparative Example 4 | 25 | 3.5 |

As shown in Table 2, the cathode materials obtained in the Examples exhibit similar material property in the particle size and the specific surface. This means that the cathode materials produced according to the above-described production conditions can be treated almost as the same powder regardless of the lithium sources and the manganese sources. It has been confirmed that similar results can be obtained for the other Examples.

Figure 20:
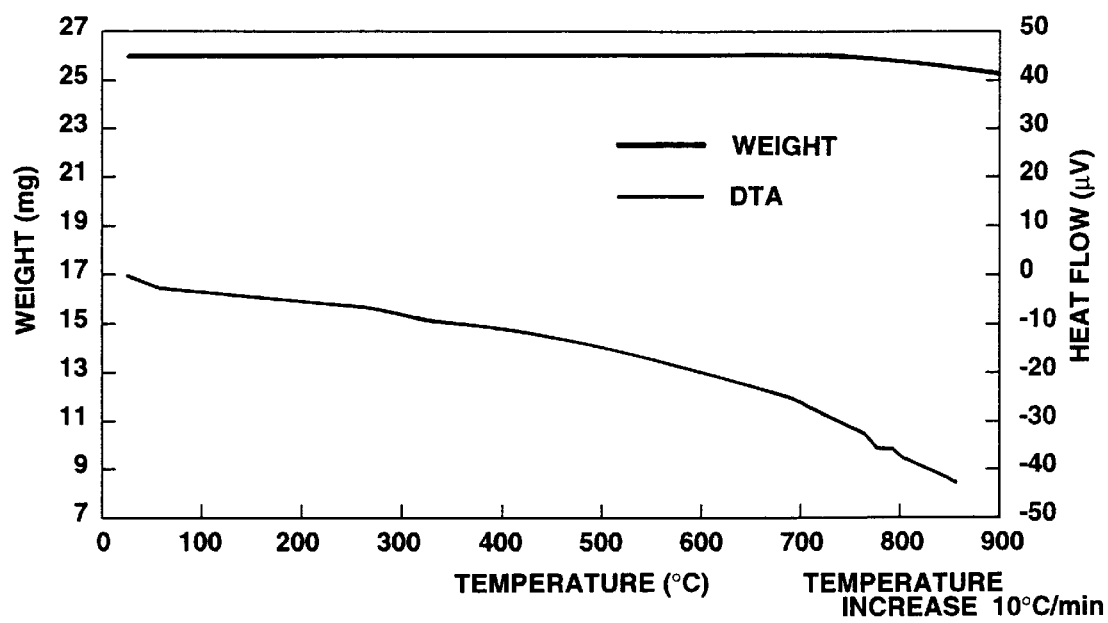
FIG. 20 is a chart showing the result of the thermal analysis of the cathode material of Example 1.

Moreover, the weight change temperature was determined for the cathode materials obtained in Examples 5 to 8 and Comparative Examples 5 to 8. The thermogravimetric analysis was carried out by using a thermobalance in an air. The temperature increase was set to a constant speed of 10° C. per minute from the room temperature up to 900° C. Thus, the weight change temperature was determined for each of the powder materials. The results are shown in FIG. 20 and Table 3. FIG. 20 shows a thermogravimetric (TG) curve and a differential thermal analysis (DTA) curve of the powder material obtained in Example 1.

TABLE 3

| Cathode material | Thermogravimetric change at (° C.) |
|---|---|
| Example 5 | 770 |
| Example 6 | 780 |
| Example 7 | 780 |
| Example 8 | 780 |
| Comparative Example 5 | 810 |
| Comparative Example 6 | 810 |
| Comparative Example 7 | 750 |
| Comparative Example 8 | 820 |

These results show that the cathode materials obtained in Examples 5 to 8 represent a lithium-manganese oxide having a thermogravimetric weight change occurs below 800° C. It was confirmed that similar results can be obtained for the other Examples. On the contrary, the cathode materials obtained in Comparative Examples, thermogravimetric change temperature does not stay at a definite level but may exceed 800° C.

Figure 19:
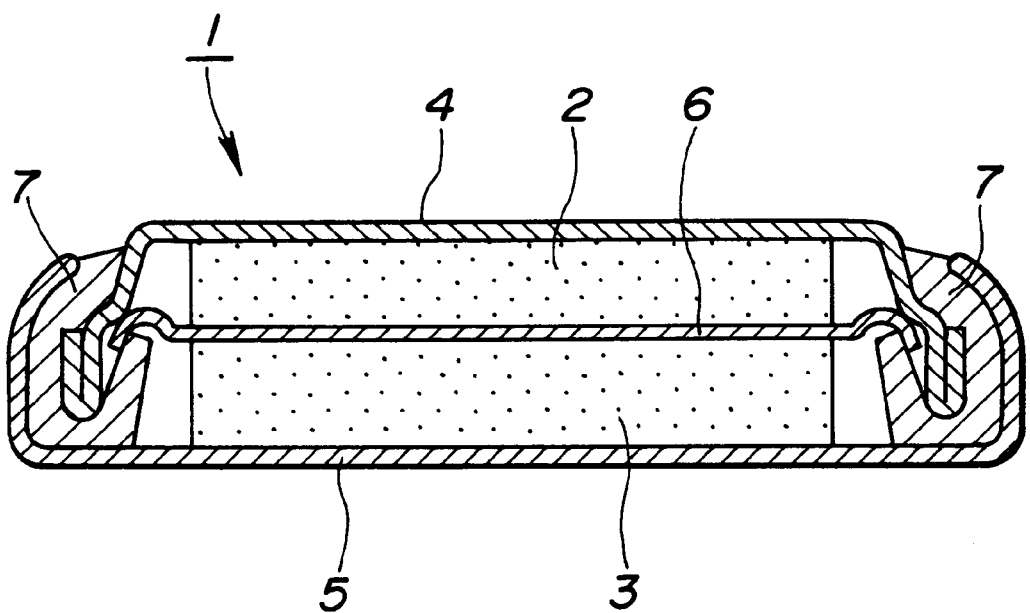
FIG. 19 is a cross-sectional view of a coin-type battery according to the present invention.

Battery Assembly:

FIG. 19 shows a coin-type battery 1 prepared by using the cathode materials (of Examples 1 to 8, and Comparative Examples 1 to 8) produced as described above.

Firstly, each of the cathode materials is mixed with graphite as a conductive material and polyvinyliden fluoride as a bonding material at a weight ratio: 90:7:3. 50 mg of this mixture was measured and, together with an aluminium net, subjected to compression molding by a compression device and dried at 120° C. for 2 hours so as to obtain an cathode pellet 2 of 15 mm diameter and 0.3 mm thickness.

As for the anode, a lithium plate of 1.6 mm thickness was prepared. From this plate, a anode pellet 3 of 17 mm diameter was punched out. The anode pellet 3 was crimped into a battery cover 4 which had been prepared in advance.

Subsequently, the cathode pellet 2 was put onto the battery casing 5 and covered with a separator 6 made from polypropylene (trade name: Cell Guard #2502 produced by Hext Co., Ltd.). Then, electrolytic solution of $LiPF_6$ dissolved in a composite solvent (propylene carbonate and diethyl carbonate mixed at a composition ratio of 1:1) at a ratio 1 moll/1 was poured into the casing. The battery cover 4 with the anode pellet 3 crimped was placed thereon, and the casing was calk(ed with a gasket 7. Thus, a coin-type battery of 20 mm diameter and 2.5 mm thickness was obtained.

Battery Test:

An open circuit voltage and a battery resistance were determined for each of the batteries produced by using the cathode materials obtained in Examples 1 to 4 and Comparative Examples 1 to 4. The results are shown in Table 4 below. The battery resistance was measured by applying 1 kHz alternating voltage.

TABLE 4

| | Battery circuit voltage (V) | Battery resistance Ω |
|---|---|---|
| Example 1 | 2.96 | 12 |
| Example 2 | 2.95 | 12 |
| Example 3 | 2.96 | 12 |
| Example 4 | 2.97 | 12 |
| Comparative Example 1 | 2.98 | 13 |
| Comparative Example 2 | 2.95 | 13 |
| Comparative Example 3 | 2.96 | 13 |
| Comparative Example 4 | 2.95 | 13 |

As shown in Table 4, each of the batteries of Examples 1 to 4 and Comparative Examples 1 to 4 showed values which can be used in practice. It has been confirmed that batteries of the other Examples also exhibit values which can be used in practice.

Moreover, for each of the coin-type batteries of Examples 1 to 8 and Comparative Examples 1 to 8, a charge/discharge test was carried out as follows.

Firstly, charge was carried out with a current density of 0.5 $mA/cm^2$ and an uppermost voltage of 4.2 V for 12 hours. After this, discharge was carried out with a current density of 0.5 $mA/cm^2$ up to 3.0 V. Next, charge was carried out with a current density of 1.0 $mA/cm^2$ and an uppermost voltage of 4.2 V for 5.5 hours, and then discharge was carried out with a current density of 1.0 $mA/cm^2$ up to a final voltage of 3.0 V. This cycle was repeated 5 times.

Figure 21:
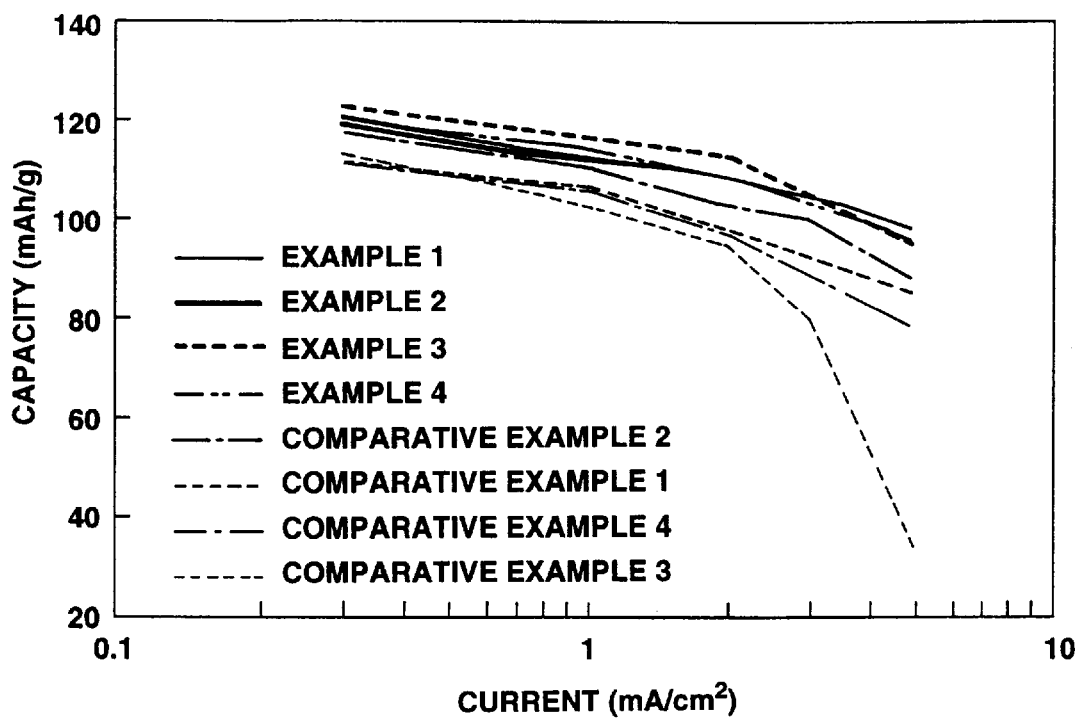
FIG. 21 is a chart showing the relationship between the current density and the discharge capacity.
Figure 22:
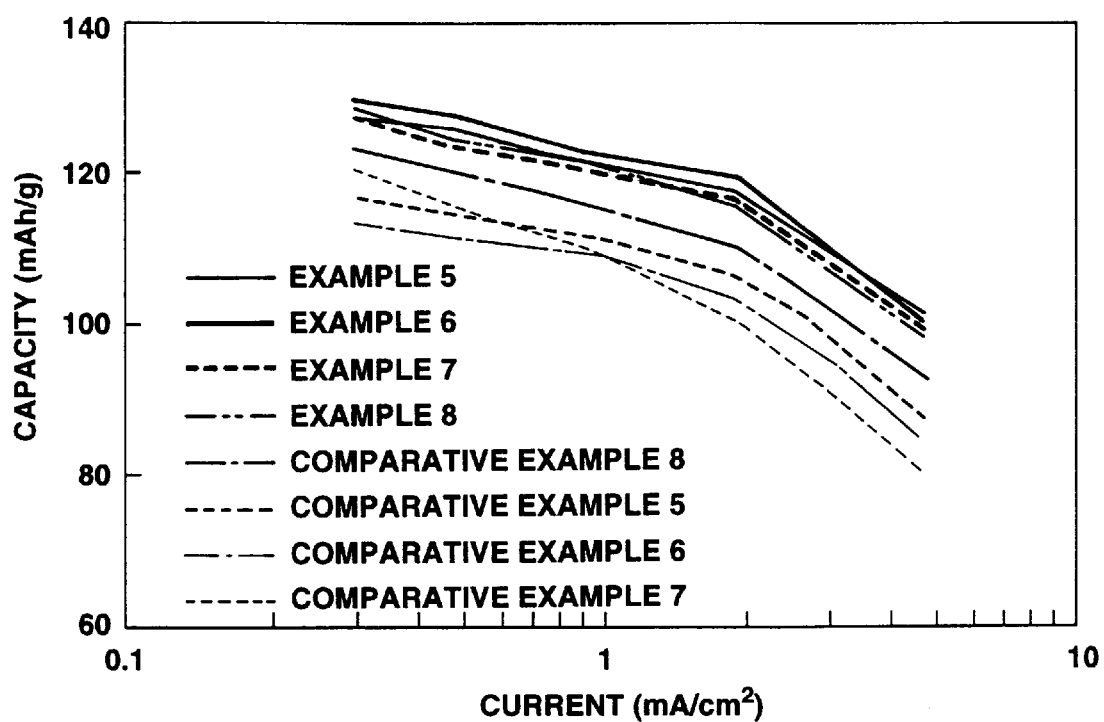
FIG. 22 is a chart showing the relationship between the current density and the discharge capacity.

Furthermore, a discharge load property test was carried out for each of the above-described batteries by charging with a current density of 1.0 $mA/cm^2$ and an uppermost voltage of 4.2 V for 5.5 hours and then discharging with a current density of 0.5 to 5 $mA/cm^2$ up to 3 V. Results of this test are shown in FIGS. 21 and 22.

Figure 23:
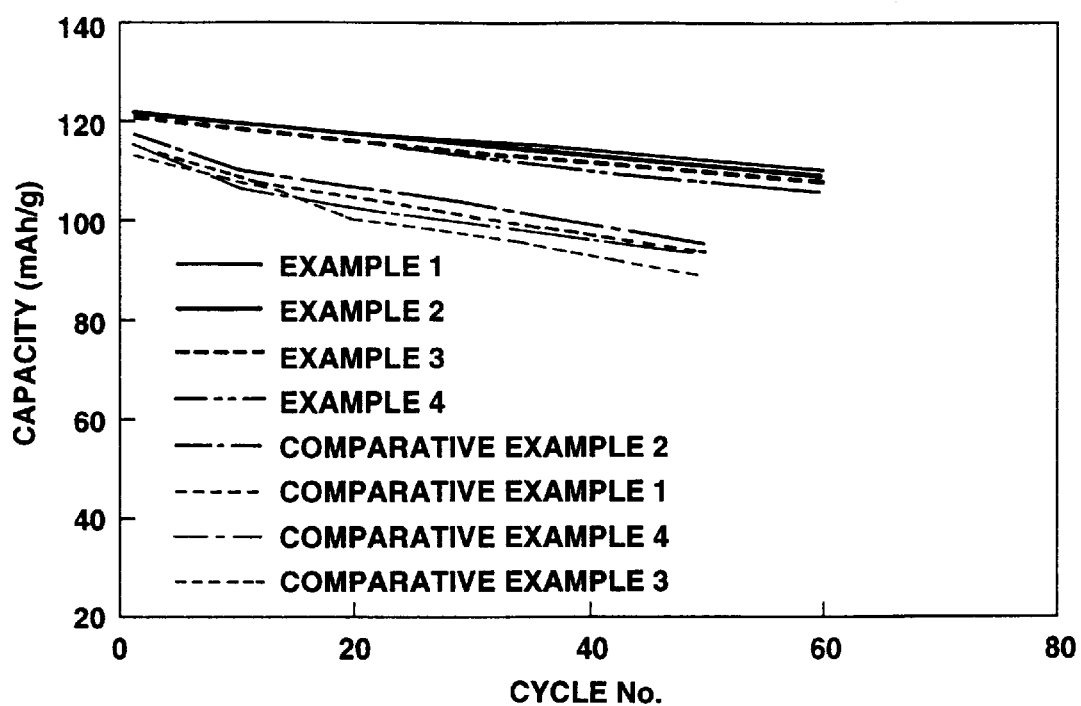
FIG. 23 is a chart showing the relationship between the number of cycles and the discharge capacity.
Figure 24:
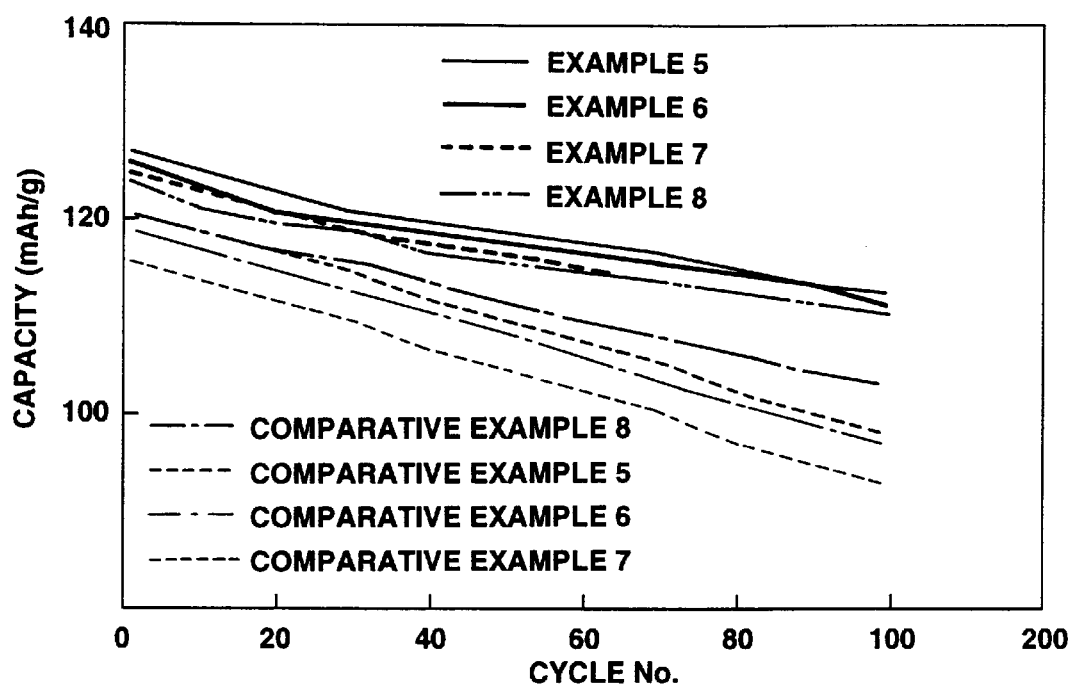
FIG. 24 is a chart showing the relationship between the number of cycles and the discharge capacity.

Moreover, a discharge/charge cycle test was carried out for each of the above-described batteries with a cycle of charging for 5.5 hours with a current density of 1.0 $mA/cm^2$ and an uppermost voltage of 4.2 V and then discharging with a current density of 1.0 $mA/cm^2$ up to 3.0 V. The results of this test are shown in FIGS. 23 and 24.

As shown in the results of FIGS. 21 through 24, batteries of Examples 1 to 8 show higher discharge load properties and superior cycle properties when compared to the batteries of Comparative Examples. This is because the batteries of Examples 1 to 8 use the cathode material of lithium-manganese oxide which shows, when subjected to an X-ray diffraction analysis, a diffraction peak intensity ratio (400)/(311) between the (311) plane and (400) plane, ranging from 1.05 to 1.20. Moreover, Examples 1 to 3 and Examples 5 to 7 which show the peak intensify ratio of (400)/(311)=1.10 to 1.15 are especially excellent in discharge load property.

On the other hand, Comparative Examples 1 to 3 and 6 to 8 show inferior discharge load property and cycle property, because the heating in the second processing step was not carried out within the range of 650 to 780° C. Even when this temperature range is satisfied, as in Comparative Example 5, if no crushing and mixing are carried out after the first processing step, and the lattice planes have no regularity, excellent discharge load property and cycle property cannot be obtained. As can be known when compared to Comparative Example 4, it is preferable that the lithium atomic ratio "x" of the lithium-manganese oxide with respect to manganese be 0.505 to 0.525. Thus, batteries of Comparative Examples which do not satisfy the aforementioned conditions cannot regulate the cathode material intensity ratio of (400)/(311) within a predetermined range, and the crystalline structure is readily deteriorated. That is, preferable battery properties cannot be obtained.

As has been shown in the aforementioned results, the present invention includes:

the first processing step wherein a lithium-manganese source having an atomic ratio of lithium with respect to manganese Li/Mn is 0.505 to 0.525 is subjected to a thermal processing at 450° C. or below; and the second processing step wherein a mixture body obtained in the first processing step is again crushed and mixed and subjected to a thermal processing at 650 to 780° C., Consequently, it is possible to obtain a lithium-manganese oxide having a spinel structure and the diffraction peak intensity ratio between the (311) plane and the (411) plane, i.e., (400)/(311), of 1.05 to 1.20. The cathode material thus obtained exhibits a thermogravimetric change at 800° C. or below.

The coin-type battery formed by using the cathode material in the above-described manner has the cathode material which shows a diffraction peak intensity ratio between the (311) plane and the (400) plane regulated to a particular range, and the thermogravimetric change occurs at 800° C. or below. Consequently, lithium ion insert/separation takes place smoothly as charge/discharge cycle proceeds. Therefore, property change of the cathode material itself or deterioration of the crystalline structure are suppressed, and an excellent discharge load property and cycle property can be obtained.

What is claimed is:

1. A non-aqueous electrolyte secondary battery comprising:

a cathode using a lithium-manganese oxide; an anode capable of doping and de-doping lithium; and a non-aqueous electrolyte, wherein said lithium-manganese oxide, when subjected to an X-ray diffraction analysis, exhibits a diffraction peak intensity ratio of 1.05 to 1.20 between the (311) plane and the (400) plane, (400)/(311).

2. The non-aqueous electrolyte secondary battery as claimed in claim 1, wherein said lithium-manganese oxide has an atomic ratio of lithium with respect to manganese, Li/Mn of 0.505 to 0.52.

3. The non-aqueous electrolyte secondary battery as claimed in claim 1, wherein said anode material is one of graphite, non-graphitizable carbon, and graphitizable carbon.

4. The non-aqueous electrolyte secondary battery as claimed in claim 1, wherein said electrolytic solution contains cyclic ester and chain ester.

5. The non-aqueous electrolyte secondary battery as claimed in claim 4, wherein said cyclic ester is at least one selected from the group consisting of propylene carbonate, ethylene carbonate, butylene carbonate, and γ-butyl lactone.

6. The non-aqueous electrolyte secondary battery as claimed in claim 4, wherein said chain ester is at least one selected from the group consisting of dimethyl carbonate, ethylmethyl carbonate, acetic ester compound, propionte ester compound, diacetic ester compound, dimethoxiethane, diethoxiethane, dimethoxypropan, tetrahydrofuran, and dioxisoran.

7. The non-aqueous electrolyte secondary battery as claimed in claim 1, wherein said lithium-manganese oxide is selected from the group consisting of $LiMn_2O_4$ and $Li_2MnO_3$, and a thermogravimetric analysis shows a thermogravimetric change at a temperature of 800° C. or below.

8. A method for producing an cathode material comprising:

a first processing step wherein a mixture of a lithium source and a manganese source in an atomic ratio of lithium with respect to manganese Li/Mn of 0.505 to 0.525 is subjected to a thermal processing at an temperature of 350° C. to about 450° C.; and a second processing step wherein a mixture body obtained in said first processing step, after being cooled down to a room temperature, is crushed, mixed, and subjected again to a thermal processing at a temperature ranging from 650 to 780° C.

* * * * *